United States Patent [19]
Bertocchi et al.

[11] Patent Number: 6,009,607
[45] Date of Patent: Jan. 4, 2000

[54] DEVICE FOR CONSTRUCTING LAMINATED ARTICLES

[75] Inventors: Gianluca Bertocchi, Mazzo Di Rho; Mario Ballerini, Lainate, both of Italy

[73] Assignee: Corrada S.p.A., Laintate, Italy

[21] Appl. No.: 09/116,655

[22] Filed: Jul. 16, 1998

Related U.S. Application Data

[62] Division of application No. 08/963,055, Nov. 3, 1997, Pat. No. 5,923,112.

[30] Foreign Application Priority Data

Dec. 6, 1996 [IT] Italy .................................. MI96A2566

[51] Int. Cl.⁷ ...................................................... B23P 19/00
[52] U.S. Cl. ........................ 29/33 K; 29/564.7; 29/564.6; 29/738
[58] Field of Search ................... 29/564.2, 564.7, 29/564.6, 33 K, 596, 609, 738; 83/527, 640

[56] References Cited

U.S. PATENT DOCUMENTS

| | | | |
|---|---|---|---|
| 4,110,895 | 9/1978 | Mitsui | 29/564.2 |
| 4,160,182 | 7/1979 | Mitsui | 310/214 |
| 4,586,236 | 5/1986 | Jones | 29/564.6 |
| 4,979,285 | 12/1990 | Martin | 29/598 |
| 5,075,150 | 12/1991 | Webb et al. | 29/609 |
| 5,142,178 | 8/1992 | Kloster et al. | 310/217 |
| 5,265,320 | 11/1993 | Greenway | 29/596 |
| 5,338,996 | 8/1994 | Yamamoto | 310/217 |
| 5,349,740 | 9/1994 | Neuenschwander | 29/596 |
| 5,406,243 | 4/1995 | Jenkins et al. | 336/217 |
| 5,757,108 | 5/1998 | Suzuki | 310/49 R |

*Primary Examiner*—William Briggs
*Attorney, Agent, or Firm*—Steinberg & Raskin, P.C.

[57] ABSTRACT

A device for constructing a laminated article, in particular for electrical use, having mutually superposed metal laminations provided with elements or clips for connecting the laminations together. The clips project from the surface of the laminations and are formed by deforming the laminations. The laminations include cavities, each arranged to house a clip, whereby the cavities and clips constitute coupling elements of male-female type. The clips are punched from a metal strip in a first station, die-cut and stacked in a second station and coupling cavities are formed in a third station which may be the same as the first station.

9 Claims, 2 Drawing Sheets

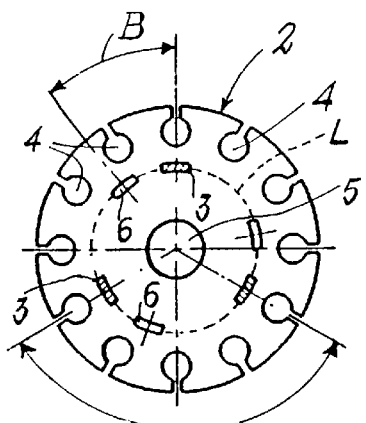
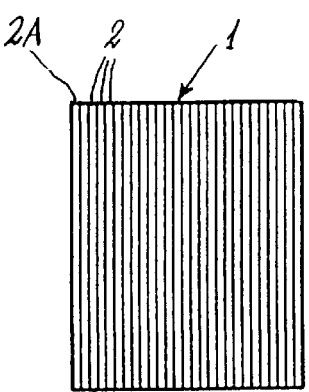
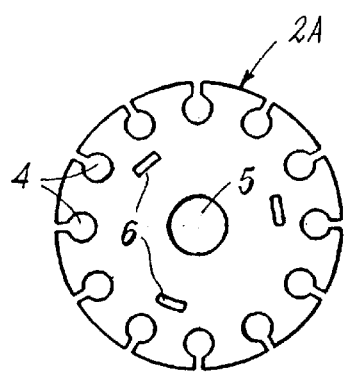
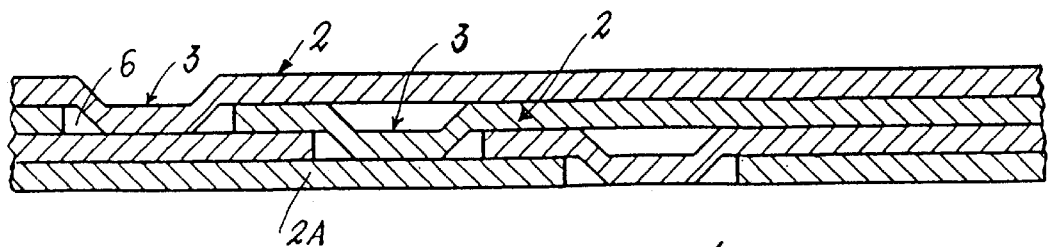
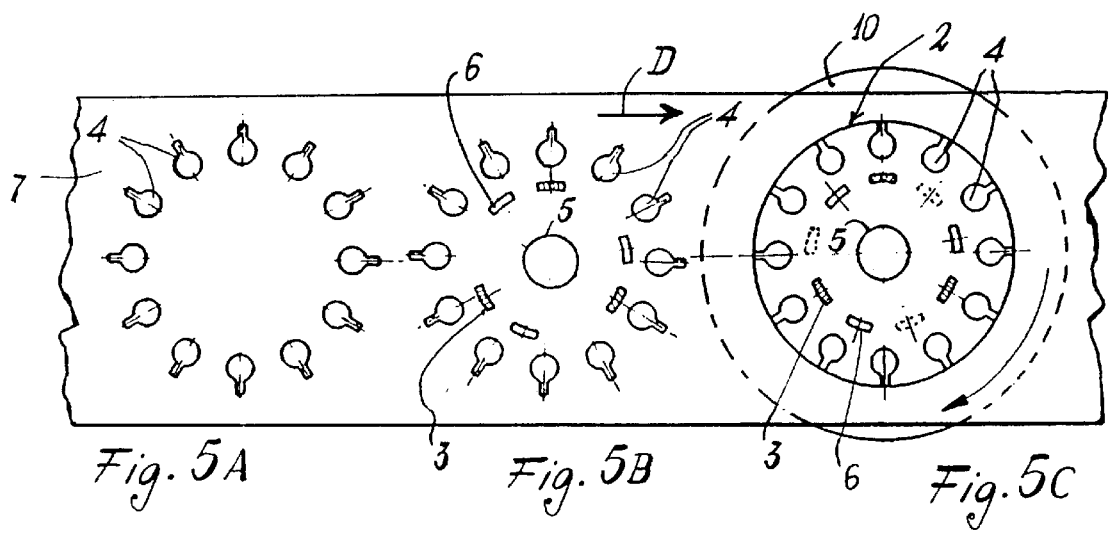

DEVICE FOR CONSTRUCTING LAMINATED ARTICLES

CROSS-REFERENCE TO RELATED APPLICATION

This application is a divisional of U.S. patent application Ser. No. 08/963,055 filed Nov. 3, 1997, now U.S. Pat. No. 5,923,112.

FIELD OF THE INVENTION

The present invention relates to devices for constructing laminated articles, in particular laminated articles for electrical use, for example an electric motor stator or rotor pack.

BACKGROUND OF THE INVENTION

Generally, laminated articles of the aforesaid type are constructed by progressive stamping. When the laminations have been stamped they are stacked, advantageously by the stamping tool itself, and are connected together by coupling elements, also known as "clips", which project from one of the faces of the lamination and are formed by deforming the lamination in particular mutually symmetrical positions.

Specifically, during coupling, the projecting part of the coupling elements of a first lamination is inserted or forced into the recessed part of the coupling elements of a second underlying lamination and so on until the last lamination of the pack is reached, which is generally not provided with projecting coupling elements and instead comprises simple through cavities, to prevent one article gripping another if laid thereon.

Coupling the laminations together in the afore-described manner has certain drawbacks. The most important drawback derives from the fact that the clips, formed by stamping a metal lamination, normally have the projecting part dimensionally larger than the recessed part (the projecting profile being determined by the die and the recessed part by the punch).

Consequently, it is very difficult to size these two parts to satisfy the clamping requirements of the article as their two shape-generating elements are linked together.

A further drawback derives from the fact that the stamping device for forming the laminated article must include a station dedicated to stamping an end lamination, which increases the complexity of the dies and hence their cost.

Moreover, laminated articles are generally compensated, i.e., they are constructed in such a manner as to overcome the geometrical and mechanical non-uniformities of the metal strip from which the laminations are punched. For this purpose, it is known to rotate each lamination relative to the preceding through a certain angle, known hereinafter as the compensation angle.

In known articles, this compensation angle is that between one clip and the next, and is hence related to the number of clips in relation to the geometry of the lamination. For example, for circular laminations the compensation angle is about 60° if six clips are present, about 90° for four clips and about 120° for three clips. The time required to rotate the lamination through the compensation angle considerably affects the construction time for the laminated article. This is particularly valid in the case of progressive stamping devices which also stack the laminations, in which at each die-cutting blow the die containing the laminations to be stacked has to be rotated.

Further drawbacks when using known clips, and in particular finned clips, occur in the case of spiraled laminated articles, for example spiraled rotor packs. In this case, to enable the projecting parts of the clips of one lamination to be inserted into the recessed parts of the next lamination while at the same time enabling the two thus compacted laminations to be slightly rotated, a discharge hole has to be provided in each lamination in correspondence with each clip, this in certain cases, for example in the case of die-cast rotors, giving rise to problems. In this respect, infiltrations of aluminum into such discharge holes have occurred, causing motor malfunction related to the creation of parasitic cages.

It should also be noted that laminated articles in which the laminations comprise clips to be coupled together have been in use for many years, but up to the present time the problem of improving such a coupling system has not arisen.

OBJECTS AND SUMMARY OF THE INVENTION

An object of the present invention is to provide a device for constructing a laminated article in which the lamination coupling is improved, particularly with regard to the requirements for their clamping together.

A further object is to provide a device for constructing a laminated article which enables the lamination stamping device to dispense with the lamination stamping station dedicated to the end laminations, with consequent reduction in the length of the stamping device.

A further object is to provide a device for constructing laminated articles comprising elements for connecting the laminations together which ensure greater rigidity to the article.

A further object is to provide a device for constructing laminated articles which in the case of compensated articles enable the stamping rate to be improved.

A further object is to provide a device for constructing laminated articles which in the case of spiraled articles enable discharge holes to be dispensed with in correspondence with the clips.

These and further objects which will be apparent to an expert of the art are attained by a device for constructing a laminated article for electrical use having a plurality of mutually superposed metal laminations provided with a plurality of elements or clips for connecting the laminations together. The clips project from a surface of the laminations and are formed by deforming the laminations. The clips are punched from a metal strip in a first station, die-cut and stacked in a second station, and coupling cavities are formed in third station. Each coupling cavity is arranged to house one of the clips. The cavities and the clip constitute separate coupling elements of female and male type respectively. The coupling cavities may be formed simultaneous with the punching of the clips, i.e., the first and third stations are the same. The punching of the clips may be intermittently suppressed in order to form an article end lamination.

In certain embodiments, the coupling cavities are positioned in correspondence with the clips in such a manner that an angle between at least one cavity and the clip closest to the at least one cavity is less than the angle between two of the clips. The cavities may be through cavities. Also, the cavities may be arranged symmetrically with each other along the same circumferential line along which the clips are also positioned, the cavities being all at the same angular distance from the clips. The cavities and the clips may also be arranged along at least one common circumferential line. The clips may be dimensioned to at least partially penetrate into cavities pertaining to different but superposed laminations.

BRIEF DESCRIPTION OF THE DRAWINGS

The present invention will be more apparent from the accompanying figures provided by way of non-limiting example, wherein equal numbers indicate equal or equivalent parts, and in which:

FIG. 1 is a schematic side view of a laminated article;

FIG. 2 is a view from above of one of the laminations of the article of FIG. 1;

FIG. 3 is a view from above of an end lamination;

FIG. 4 is a partially sectional enlarged schematic view of the laminations indicated by the arrow A of FIG. 1 of the article shown in FIG. 1, the section having been taken on a broken line (not shown) in order to highlight the coupling between one lamination and another;

FIGS. 5A, 5B, 5C show the stamping steps required to form one of the laminations represented in FIGS. 2 and 3.

DETAILED DESCRIPTION OF THE PREFERRED EMBODIMENTS

Figure 4A:
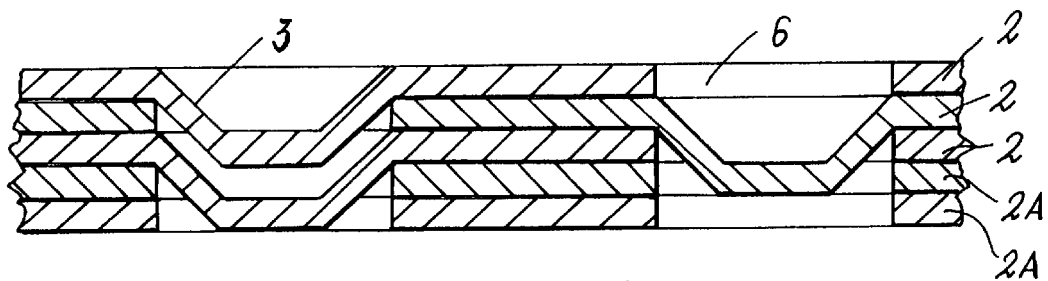
FIGS. 4A and 4B are a view similar to FIG. 4, but showing a modified embodiment.
Figure 4B:
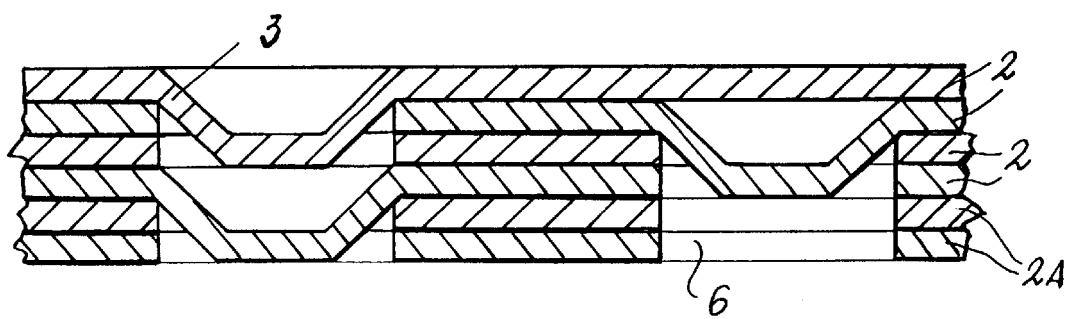

Referring to the accompanying drawings wherein like reference numerals refer to the same or similar elements, FIGS. 1, 2 and, 3 show a laminated article, indicated overall by 1, comprising a plurality of mutually superposed metal laminations 2 (twenty-seven are shown in FIG. 1), each comprising three coupling elements or clips 3 projecting from the surface of the laminations and three through coupling cavities 6. More specifically, FIG. 1 shows as the laminated article a conventional compensated rotor pack for electric motors. As is usual in conventional rotor packs, each lamination 2 comprises a series of profiled through cavities 4 provided along the outer edge, a central through hole 5, and the coupling clips 3. In the illustrated example, the coupling clips are of the angle plate type (as shown in FIG. 4), but could also be of different type, for example of button, angled button or fin type. The coupling cavities 6 are arranged to house the clips 3 of the adjacent lamination. These cavities are preferably arranged symmetrically to each other along the same circumferential line L (FIG. 2) along which the clips 3 are formed, and all at the same angular distance B (FIG. 2) from the clips.

It should be noted that the clips could also be arranged unsymmetrically to each other, and that the cavities 6 and clips 3 could be arranged along different circumferential lines, each circumferential line comprising at least one cavity and one clip, and such that all the cavities are at the same angular distance from the clips 3.

Advantageously, the cavities 6 are through cavities, as shown in FIG. 4. They could however also be shaped as a recessed female element, for housing the projecting portion of the clips 3. The cavities 6 can be dimensioned to engage the clips 3 with a certain clearance (as in FIG. 4) or with greater contact, depending on the clamping requirements for the laminations and/or on the need to form spiraled articles.

The cavities 6 are also advantageously provided in positions substantially adjacent to the clips 3, so that when a compensated article is to be formed, the laminations 2 being stacked are rotated one relative to the other only by the angle B (FIG. 2) between a clip 3 and a cavity 6, and not by the angle C (FIG. 2) between one clip and the next, which happens if using known laminations. In this manner, the overall time for stamping and stacking the article is considerably reduced. The cavities 6 can also be positioned and/or be in such a number as to enable the projecting part, suitably increased in height, to engage two underlying laminations, or penetrate two cavities in these laminations (see schematic FIGS. 4A and 4B).

The end lamination or laminations 2A (FIGS. 1, 3) of the laminated article do not comprise clips 3 but only cavities 6, to prevent two superposed articles becoming connected.

The method for obtaining the laminations 2, 2A and for their stacking comprises a series of stamping stages carried out on a metal strip 7. In a first stage, the perimetral shaped through cavities 4 are formed (FIG. 5A), in the next stage there being formed the coupling cavities, the central hole 5 and the clips 3 by deforming the strip (FIG. 5B). These stages can be concentrated into a single stage. In the third stage, the lamination 2 of 2A is die-cut from the strip (FIG. 5C).

Advantageously, simultaneously with the die-cutting, the die-cut lamination is stacked and then rotated through the compensation angle B together with the pack of laminations with which the lamination has been engaged. The aforedescribed method can be implemented by a usual progressive stamping device comprising a station for each of the afore-listed stages, and which in particular for the die-cutting third stage comprises a conventional rotary die 10. More specifically, the stamping device comprises stations which operate simultaneously on a metal strip 7 which advances periodically in a predetermined direction D (FIG. 5). At each blow of the device, the cavities 4 are formed in a first station (FIG. 5A), the cavities 6, the clips 3 and the hole being formed in a second station following the first, but with the facility for forming the cavities 4, the cavities 6, the clips 4 and the hole 5 in a single station or with a different distribution within the two stations. A lamination 2 or 2A is die-cut and stacked in a third station following the second, and is then rotated through the compensation angle. After the operations in each station have been completed, the strip 7 is advanced through one step and the device proceeds with a further blow. It should be noted that in the third station the lamination is die-cut by a rotary die 10. In this respect, when the strip originating from the second station reaches the third station, on the rotary die there is already present a lamination which has been previously die-cut, stacked and rotated through an angle B, consequently the clips 3 of the current lamination to be cut out by the die become positioned in the cavities of the underlying lamination, to couple to this latter. The lamination is then cut out by the die. At this point, the die 10 is rotated through an angle B, so that the lamination which has just been cut out and coupled to the underlying laminations becomes located with the cavities in the correct position to receive the clips of the next lamination to be die-cut.

It should be noted that compared with known stamping devices, in the device of the invention the station for punching the clips 3 is modified by also being provided with punches for forming the coupling cavities 6, and by allowing the clip punching punches to be deactivated to leave those for the cavities 6 in operation. In this manner, the same station can be used not only for forming usual laminations 2 but also for forming those laminations 2A for the end of the pack.

It should be further noted that the laminations of the invention result in more rigid packs. if for example laminations are used comprising two diametrically opposite clips and two cavities positioned along the same circumferential line as the clips but at 90° from this latter, the clips of the pack are no longer mutually aligned, as happens if using known laminations, but only the clips of two laminations every three are mutually aligned, i.e., the clips of the first lamination are out of alignment with those of the third, and the clips of the second are out of alignment with those of the fourth, and so on. It has been found that packs obtained in this manner are more rigid than traditional packs.

In a possible modification, the device could comprise separate stations for forming the clips 3 and the coupling cavities 6 and also punches for cutting cavities 6 in correspondence with the clips 3 without deactivating the clip-forming punches.

It should be noted that the punches used for forming the cavities 6 and clips 3 are advantageously different from each other, to enable the cavities to be dimensioned in the most suitable manner, taking account of the clamping and spiraling requirements of the article.

We claim:

1. A device for constructing a laminated article for electrical use having a plurality of mutually superposed metal laminations provided with a plurality of abutting elements or abutting clips for connecting the laminations together, the clips projecting from a surface of the laminations and being formed by deforming the laminations, comprising:

a first station in which the clips are punched from a metal strip, a second station in which the laminations are die-cut and stacked, and a third station in which coupling cavities are formed in the laminations in locations which are spaced apart from the clips such that a portion of the metal strip remains between each coupling cavity and each clip, each coupling cavity arranged to house one of the clips, the cavities and the clip constituting separate coupling elements of female and male type respectively.

2. The device of claim 1, wherein the clips are punched and the coupling cavities are formed at a single station.

3. The device of claim 1, further comprising cavity-forming means for forming the coupling cavities arranged in the third station and clip-forming means for forming clips arranged in the first station, the cavity-forming means and clip-forming means being mutually independent whereby the clip-forming means are deactivateable while maintaining the cavity forming means in operation.

4. The device of claim 1, wherein the coupling cavities are positioned in correspondence with the clips in such a manner that an angle between at least one cavity and the clip closest to the at least one cavity is less than an angle between two of the clips.

5. The device of claim 1, wherein the cavities are through cavities.

6. The device of claim 1, wherein the cavities are arranged symmetrically with each other along a common circumferential line along which the clips are also positioned, the cavities being all at a set angular distance from the clips.

7. The device of claim 1, wherein the cavities and the clips are arranged along at least one common circumferential line.

8. The device of claim 1, wherein the clips are dimensioned to at least partially penetrate into cavities pertaining to different but superposed laminations.

9. A device for constructing a laminated article for electrical use having a plurality of mutually superposed metal laminations provided with a plurality of abutting elements or abutting clips for connecting the laminations together, the clips projecting from a surface of the laminations and being formed by deforming the laminations, comprising:

a first station in which the clips are punched from a metal strip, a second station in which the clips are die-cut and the laminations are stacked, a third station in which coupling cavities are formed in the laminations, each arranged to house one of the clips, the cavities and the clip constituting separate coupling elements of female and male type respectively, and cavity-forming means for forming the coupling cavities arranged in the third station and clip-forming means for forming clips arranged in the first station, the cavity-forming means and clip-forming means being mutually independent whereby the clip-forming means are deactivateable while maintaining the cavity forming means in operation.

* * * * *